United States Patent [19]

Guthrie

[11] 3,904,423

[45] Sept. 9, 1975

[54] ALKALI RESISTANT GLASS

[75] Inventor: Bernard M. Guthrie, Corvallis, Oreg.

[73] Assignee: Evans Products Company, Portland, Oreg.

[22] Filed: Apr. 16, 1973

[21] Appl. No.: 351,582

[52] U.S. Cl. .................................. 106/50; 106/54
[51] Int. Cl.². C03C 13/00; C03C 3/04; C03C 3/08
[58] Field of Search .................... 106/50, 52, 53, 54

[56] References Cited
UNITED STATES PATENTS

| | | | |
|---|---|---|---|
| 3,673,049 | 6/1972 | Giffen et al. | 106/54 |
| 3,783,092 | 1/1974 | Majumpar | 106/52 |

FOREIGN PATENTS OR APPLICATIONS

| | | | |
|---|---|---|---|
| 157,070 | 1963 | U.S.S.R. | 106/50 |
| 124,553 | 1939 | Australia | 106/50 |

Primary Examiner—Winston A. Douglas
Assistant Examiner—Mark Bell
Attorney, Agent, or Firm—Klarquist, Sparkman, Campbell, Leigh, Hall & Whinston

[57] ABSTRACT

Fiber making glass of high alkaline resistance is formed of oxides of Groups II, III and IV elements in ratio to provide modulus of acidity between about 1.1 and 2.2, the glass including oxides of silicon, aluminum, calcium, magnesium, zirconium, boron and zinc or substitutes.

15 Claims, No Drawings

ALKALI RESISTANT GLASS

BACKGROUND OF INVENTION

The present invention relates to a glass composition having a high resistance to degradation in an alkaline environment, particularly to the alkalis found in Portland cement and in calcium silicate insulation products.

More particularly, the present invention relates to an alkaline resistant glass composition from which glass fiber can be drawn or spun.

There are many areas in which a strong glass fiber having good resistance to degradation by an alkaline environment could be utilized. Available glass fiber, including "E" fiber, does not have sufficient resistance to alkaline attack to permit its use in strongly alkaline environments. In an effort to utilize such a fiber protective coatings have been applied but with limited success.

SUMMARY OF THE INVENTION

In accordance with the present invention a glass of high alkaline resistance is provided by forming the glass essentially of oxides of Groups II, III and IV elements including the following in mole percentages: 35 to 58 percent silicon oxide; 1 to 12 percent aluminum oxide; 5 to 32 percent calcium oxide; 1.5 to 5 percent zirconium oxide; 3 to 13 percent boron oxide; and up to 12 percent zinc oxide. The composition of the invention may be expressed in terms of modulus of acidity ($A_m$) as follows:

$$A_m = \frac{\text{Acidic oxides}}{\text{Basic oxides}} \text{ or } \frac{\text{Groups III oxides + Group IV oxides}}{\text{Group I oxides + Group II oxides}}$$

wherein the oxides are expressed as mole percentages of the whole.

Such glasses may be drawn or spun to form fibers or blown or otherwise formed to produce laboratory glass ware or the like. Alkali metal oxides (Group I) may be added in small quantities (less than two mole percent) to improve working characteristics but will somewhat reduce the resistance of the glass to alkali.

DETAILED DESCRIPTION OF THE INVENTION

The objects of the present invention are obtained by providing a glass having a composition in the range set forth more specifically below but essentially comprising the oxides of the elements of Groups II, III and IV, with a maximum of about 2% of the oxides of Group I elements. Glasses of such composition have good resistance to alkali attack and in addition have working characteristics which enable glass fiber to be formed. The composition of the glass of the invention can be expressed in terms of its modulus of acidity ($A_m$) as determined by the following formula:

$$A_m = \frac{\text{Acidic oxides}}{\text{Basic oxides}}$$

wherein the oxides are expressed in terms of moles or mole percentage of the whole.

The modulus of acidity of the glass of the invention is in the range of between about 1.1 and 2.2 with an optimum of between about 1.4 to 1.8. An eutectic point appears to be reached with a composition having a modulus of acidity of 1.62.

Expressed in terms of oxides of the various elementary groupings, the modulus of acidity can be expressed as follows:

$$A_m = \frac{\text{Oxides of Group III + oxides of Group IV}}{\text{Oxides of Group I + oxides of Group II}}$$

wherein the oxide content is expressed in mole percentages of the whole.

I have found that a glass having excellent alkaline resistance is formed if the ingredients are selected from oxides of the elements in Groups II, III and IV in the following mole percentages:

| | |
|---|---|
| Group II oxides | 33–48% |
| Group III oxides | 5–19% |
| Group IV oxides | 40–60% |

The eutectic composition appears to comprise 38.13% Group II oxides, 8.01% Group III oxides, and 53.86% Group IV oxides.

The glass of the invention contains each of the following oxides:

$SiO_2$, $Al_2O_3$, $ZrO_2$, $B_2O_3$, $CaO$, and preferably $ZnO$ and $MgO$. $TiO_2$, $SrO$, $BaO$ and $SnO_2$ especially, and also other Group II oxides such as $BeO$ and $CdO$ may also be utilized to provide particular working characteristics that may be desired. The barium, strontium, beryllium and cadmium oxides are substitutes in part for zinc oxide and the total of this group of oxides should not exceed the total allowable content of zinc oxide. I have found that there is a fairly wide range of proportions of the requisite ingredients which will produce a glass which, when made into a fiber, will have excellent durability in an alkaline environment. The highly complex nature of the glass appears to contribute significantly to its durability and the proportions of the ingredients may be varied to achieve the most desirable working characteristic for various manufacturing processes or various products. The particular ingredient proportions which I have found permissible are listed below:

| Oxide | Mole percentage |
|---|---|
| $SiO_2$ | 35–58 |
| $ZrO_2$ | 1.5–5 |
| $TiO_2$ | 0–12 |
| $Al_2O_3$ | 1–12 |
| $CaO$ | 5–32 |
| $MgO$ | 0–18 |
| $ZnO$ | 0–12 |
| $SrO$ | 0–5 |
| $BaO$ | 0–5 |
| $SnO_2$ | 0–10 |
| $B_2O_3$ | 3–13 |

Table I in mole percent and Table II in weight percent disclose various glass compositions made in accordance with the present invention.

TABLE I

|  | SiO$_2$ | ZrO$_2$ | B$_2$O$_3$ | Al$_2$O$_3$ | CaO | MgO | ZnO | SrO | BaO | TiO$_2$ |
|---|---|---|---|---|---|---|---|---|---|---|
| 1. | 51.60 | 2.67 | 4.27 | 3.04 | 17.15 | 14.59 | 1.87 | 2.99 | 1.82 | |
| 2. | 51.64 | 2.65 | 4.24 | 3.02 | 18.56 | 16.19 | 1.89 | | 1.81 | |
| 3. | 41.71 | 2.71 | 9.60 | 8.86 | 21.45 | 7.46 | 8.21 | | | |
| 4. | 39.08 | 2.57 | 6.83 | 3.73 | 30.55 | 9.44 | 7.80 | | | |
| 5. | 41.02 | 2.70 | 7.17 | 5.22 | 21.85 | 6.77 | 8.18 | | | 7.09 |
| 6. | 48.62 | 2.64 | 6.99 | 6.37 | 22.70 | 7.09 | 5.59 | | | |
| 7. | 50.96 | 2.51 | 4.88 | 3.03 | 18.75 | 12.27 | 7.60 | | | |
| 8. | 51.64 | 2.65 | 4.24 | 3.02 | 18.66 | 12.22 | 7.57 | | | |
| 9. | 51.57 | 2.62 | 4.28 | 3.05 | 15.82 | 13.36 | 7.48 | | 1.82 | |
| 10. | 48.44 | 2.54 | 6.74 | 6.14 | 16.63 | 14.13 | 5.38 | | | |
| 11. | 51.76 | 2.50 | 4.32 | 3.01 | 18.54 | 16.17 | 3.70 | | | |

TABLE II (WEIGHT PERCENT)

|  | SiO$_2$ | ZrO$_2$ | B$_2$O$_3$ | Al$_2$O$_3$ | CaO | MgO | ZnO | SrO | BaO | TiO$_2$ |
|---|---|---|---|---|---|---|---|---|---|---|
| 1. | 48.98 | 5.20 | 4.70 | 4.90 | 15.20 | 9.30 | 2.41 | 4.90 | 4.41 | |
| 2. | 50.40 | 5.30 | 4.80 | 5.00 | 16.91 | 10.60 | 2.50 | | 4.51 | |
| 3. | 38.06 | 5.07 | 10.16 | 13.72 | 18.27 | 4.57 | 10.15 | | | |
| 4. | 37.56 | 5.07 | 7.61 | 6.09 | 27.42 | 6.09 | 10.16 | | | |
| 5. | 37.57 | 5.07 | 7.61 | 8.11 | 18.68 | 4.16 | 10.15 | | | 8.64 |
| 6. | 45.66 | 5.09 | 7.61 | 10.15 | 19.91 | 4.47 | 7.11 | | | |
| 7. | 49.50 | 5.00 | 5.50 | 5.00 | 17.00 | 8.00 | 10.00 | | | |
| 8. | 50.13 | 5.28 | 4.77 | 4.98 | 16.92 | 7.96 | 9.96 | | | |
| 9. | 48.83 | 5.09 | 4.70 | 4.90 | 13.99 | 8.49 | 9.60 | | 4.40 | |
| 10. | 46.50 | 5.00 | 7.50 | 10.00 | 14.90 | 9.10 | 7.00 | | | |
| 11. | 51.66 | 5.12 | 5.00 | 5.10 | 17.28 | 10.84 | 5.00 | | | |

To make the glass of the invention the oxides of the Groups II, III and IV elements selected are preferably throughly mixed in a finely divided form and then placed in a suitable melting pot. A conventional alkaline earth halide flux such as calcium fluoride can be mixed with the ingredients in percentage of between about 1.25% to not more than 10% by weight to aid in the melting of the ingredients. The halide component of this flux is volatilized during the melting and refining cycle and only trace amounts, if any, remain in the final glass, the amount being insufficient to provide any substantial effect. The alkaline earth component is oxidized and appears in the final composition as an oxide. The compositions given herein are based on conversion of any flux to the oxide in the final composition. A glass formulation for drawing fiber preferably has a low working temperature but a high viscosity at the liquidous temperature and as flat a temperature-viscosity curve in the working temperature range as possible. The formulations given above in Table I and those falling within the ranges suggested previously do provide glasses of such properties. Variations of the ingredients and their percentages can be selected in accordance with the qualities desired in the finished glass. Those skilled in the art will, with the information provided them herein, be able to select such variations.

Since the liquidous temperature of the glasses of this invention may be nearly as high as the working temperature, it has been my experience that to avoid possible devitrification or crystalization of the glass, it should be heated to a temperature well above the working range and held at such temperature for sufficient time to insure that all crystals have been dissolved. The glass is then allowed to cool to the working temperature at which glass fibers or other products are to be made.

The invention is further illustrated by the following example:

EXAMPLE

Mixed together were the following ingredients each of which was finer than 200 mesh:

| | Proportion weight basis |
|---|---|
| Sand | 43.3 parts |
| Kaolin | 12.9 parts |
| Zinc oxide | 5.0 parts |
| Fluorospar | 3.1 parts |
| Dolomite | 49.8 parts |
| Boric acid | 8.9 parts |
| Zirconium silicate | 7.4 parts |

The final glass formed after processing as described below had the following composition:

| Ingredients | Mole Percentage | Weight Percentage |
|---|---|---|
| SiO$_2$ | 51.75 | 51.30 |
| ZrO$_2$ | 2.50 | 5.08 |
| Al$_2$O$_3$ | 4.32 | 7.27 |
| B$_2$O$_3$ | 3.01 | 3.46 |
| CaO | 18.54 | 17.16 |
| MgO | 16.17 | 10.76 |
| ZnO | 3.70 | 4.97 |

The mole percentages given above are calculated on the basis of the composition of the final glass, the fluorine and other gaseous components being eliminated by volatilization during the glass forming process.

After thoroughly mixing the initial ingredients they were put into an electric furnace and melted together, the composition being held at 2,500°F. for 4 hours. The molten glass was then put into a draw furnace and the temperature reduced and maintained between 2,040° and 2,140°F. while fibers were drawn. The drawn glass fibers had a diameter of between 12 and 20 microns as determined by visual observation. A sample of the glass fibers was put into an autoclave containing sodium hydroxide solution of pH 12 and maintained at 366°F. for 4 hours by holding the sample at a steam pressure of 150 psi. From visual observation of the sample and the alkali solution (which discolors upon dissolution of any glass therein) there was no apparent dissolution of the glass and the loss in strength of the fiber did not exceed 30%.

A 100 gram sample of the glass composition was also held for about 24 hours at 2,000°F. without observable crystal growth.

The modulus of acidity of the final composition was 1.60.

A glass composition made in accordance with the invention will have various uses. As indicated previously, the preferred glass compositions have desirable characteristics for the drawing of glass fiber and which because of its alkaline resistance can be utilized in cementious compositions having high alkaline content. The glasses may also be used for laboratory ware and in like environments. To aid in blowing or other forming operations, it may be desirable to add small amounts of oxides of monovalent alkalis, but it will be recognized that the addition of such alkalis will cause a reduction in the alkaline resistance. A maximum of about 2% monovalent alkali will be tolerable. For the making of glass fibers, however, preferably no monovalent alkali should be present.

I claim:

1. Glass composition having a modulus of acidity of between about 1.1 and 2.2 and consisting essentially of the following oxides, expressed in mole percentages:

| | |
|---|---|
| $SiO_2$ | 35–58 |
| $ZrO_2$ | 1.5–5 |
| $TiO_2$ | 0–12 |
| $Al_2O_3$ | 1–12 |
| CaO | 5–32 |
| MgO | 0–18 |
| ZnO | 1–12 |
| SrO | 0–5 |
| BaO | 0–5 |
| $SnO_2$ | 0–10 |
| $B_2O_3$ | 3–13. |

2. A glass composition as set forth in claim 1 wherein the modulus of acidity is between about 1.4 and 1.8.

3. A glass composition as set forth in claim 1 wherein the modulus of acidity is 1.62.

4. A glass composition as set forth in claim 1 consisting essentially, in mole percent:

| | |
|---|---|
| $SiO_2$ | 51.60 |
| $ZrO_2$ | 2.67 |
| $B_2O_3$ | 4.27 |
| $Al_2O_3$ | 3.04 |
| CaO | 17.15 |
| MgO | 14.59 |
| ZnO | 1.87 |
| BaO | 1.82 |
| SrO | 2.99. |

5. A glass composition as set forth in claim 1 consisting essentially, in mole percent:

| | |
|---|---|
| $SiO_2$ | 51.64 |
| $ZrO_2$ | 2.65 |
| $B_2O_3$ | 4.24 |
| $Al_2O_3$ | 3.02 |
| CaO | 18.56 |
| MgO | 16.19 |
| ZnO | 1.89 |
| BaO | 1.81. |

6. A glass composition as set forth in claim 1 consisting essentially, in mole percent:

| | |
|---|---|
| $SiO_2$ | 41.71 |
| $ZrO_2$ | 2.71 |
| $Al_2O_3$ | 8.86 |
| $B_2O_3$ | 9.60 |
| CaO | 21.45 |
| MgO | 7.46 |
| ZnO | 8.21. |

7. A glass composition as set forth in claim 1 consisting essentially, in mole percent:

| | |
|---|---|
| $SiO_2$ | 39.08 |
| $ZrO_2$ | 2.57 |
| $Al_2O_3$ | 3.73 |
| $B_2O_3$ | 6.83 |
| CaO | 30.55 |
| MgO | 9.44 |
| ZnO | 7.80. |

8. A glass composition as set forth in claim 1 consisting essentially, in mole percent:

| | |
|---|---|
| $SiO_2$ | 41.02 |
| $ZrO_2$ | 2.70 |
| $Al_2O_3$ | 5.22 |
| $B_2O_3$ | 7.17 |
| CaO | 21.85 |
| MgO | 6.77 |
| ZnO | 8.18 |
| $TiO_2$ | 7.09. |

9. A glass composition as set forth in claim 1 consisting essentially, in mole percent:

| | |
|---|---|
| $SiO_2$ | 48.62 |
| $ZrO_2$ | 2.64 |
| $Al_2O_3$ | 6.37 |
| $B_2O_3$ | 6.99 |
| CaO | 22.70 |
| MgO | 7.09 |
| ZnO | 5.59. |

10. A glass composition as set forth in claim 1 consisting essentially, in mole percent:

| | |
|---|---|
| $SiO_2$ | 50.96 |
| $ZrO_2$ | 2.51 |
| $B_2O_3$ | 4.88 |
| $Al_2O_3$ | 3.03 |
| CaO | 18.75 |
| MgO | 12.27 |
| ZnO | 7.60. |

11. A glass composition as set forth in claim 1 consisting essentially, in mole percent:

| | |
|---|---|
| $SiO_2$ | 51.64 |
| $ZrO_2$ | 2.65 |
| $B_2O_3$ | 4.24 |
| $Al_2O_3$ | 3.02 |
| CaO | 18.66 |
| MgO | 12.22 |
| ZnO | 7.57. |

12. A glass composition as set forth in claim 1 consisting essentially, in mole percent:

| | |
|---|---|
| $SiO_2$ | 51.57 |
| $ZrO_2$ | 2.62 |
| $Al_2O_3$ | 3.05 |
| $B_2O_3$ | 4.28 |
| MgO | 13.36 |
| CaO | 15.82 |
| ZnO | 7.48 |
| BaO | 1.82. |

13. A glass composition as set forth in claim 1 consisting essentially, in mole percent:

| | |
|---|---|
| $SiO_2$ | 48.44 |

-continued

| | |
|---|---|
| $ZrO_2$ | 2.54 |
| $Al_2O_3$ | 6.14 |
| $B_2O_3$ | 6.74 |
| CaO | 16.63 |
| MgO | 14.13 |
| ZnO | 5.38. |

14. A glass composition as set forth in claim 1 consisting essentially, in mole percent:

| | |
|---|---|
| $SiO_2$ | 51.76 |
| $ZrO_2$ | 2.50 |
| $Al_2O_3$ | 3.01 |
| $B_2O_3$ | 4.32 |
| CaO | 18.54 |
| MgO | 16.17 |
| ZnO | 3.70. |

15. Glass fibers having properties and composition set forth in claim 1.

* * * * *